No. 831,998. PATENTED SEPT. 25, 1906.
W. R. SINE.
HARD RUBBER ARTICLES.
APPLICATION FILED JAN. 27, 1906.

Attest:
C. S. Middleton
Edward N. Saxton

Inventor
William R. Sine.
by Fear, Middleton, Donaldson & Fear.
Attys.

UNITED STATES PATENT OFFICE.

WILLIAM R. SINE, OF WILLIAMSPORT, PENNSYLVANIA.

HARD-RUBBER ARTICLES.

No. 831,998.  Specification of Letters Patent.  Patented Sept. 25, 1906.

Application filed January 27, 1906. Serial No. 298,247.

*To all whom it may concern:*

Be it known that I, WILLIAM R. SINE, a citizen of the United States, residing at Williamsport, Pennsylvania, have invented certain new and useful Improvements in Hard-Rubber Articles, of which the following is a specification.

My invention relates to the manufacture of hard-rubber articles; and it consists in the process hereinafter described, and particularly pointed out in the claims.

Figure 1:
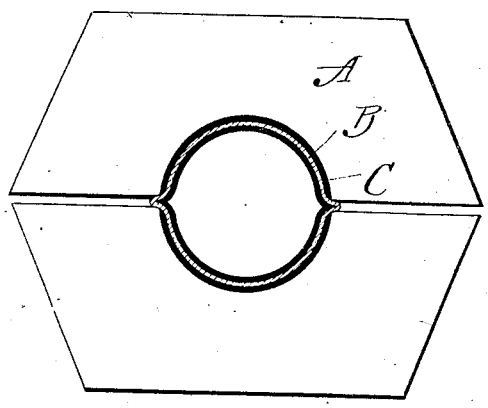
Figure 2:
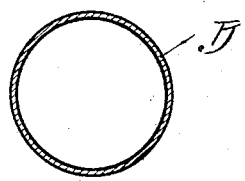

In the accompanying drawings, Figure 1 represents a cross-sectional view of a mold in which the article to be vulcanized is placed, such figure representing the objectionable features which my present invention is designed to overcome. Fig. 2 represents a fabric of tubular form frictioned or saturated with hard-rubber compound after being subjected to one step in my process, and Fig. 3 represents the fabric of Fig. 2 covered with the rubber compound and showing it in the mold undergoing the final step in my improved process.

Figure 3:
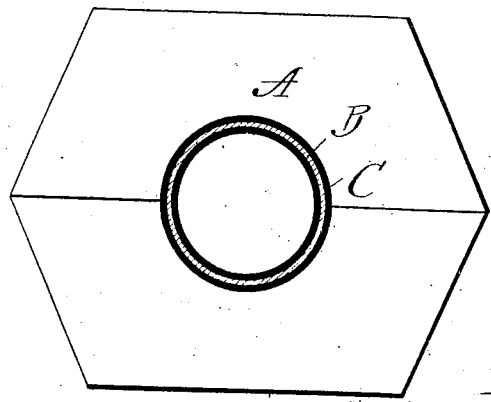

In Figs. 1 and 3 the mold is shown at A, the fabric at B, and the rubber coatings at C. Fig. 1 shows how the lining has become pinched at the joint of the molds, and Fig. 3 shows the perfect operation due to the present process.

In experimenting upon the invention shown in Letters Patent No. 785,234, granted to me on the 21st of March, 1905, I found difficulty, due to the fact that when the saturated fabric was placed in the mold for vulcanization where the article being manufactured was tubular in cross-section the flexibility of the saturated fabric caused buckling at the joints of the mold, and thus formed protuberances which penetrated the rubber compound intended to cover the fabric, these protuberances showing on the finished article in a line of the exposed fabric. In order to overcome this, I take the saturated fabric after it comes from the rolls, cut it into the shape required, and place the blank thus formed around the mandrel, with preferably some of the rubber compound between the mandrel and the fabric to form the inner lining of rubber, and then subject the article thus partially formed to vulcanization, preferably in a dry vulcanizer, sufficient to stiffen or harden the blank. This enables the proper handling of the blank in the further operation. The outer layer of rubber compound is then placed around the blank without danger of said blank changing its shape, and the article is then placed in the mold and vulcanized. While this treatment is particularly necessary where the process is carried out in connection with tubular articles, it is of very great advantage in all classes of articles made according to this process, as it prevents displacement of the article in the mold, as will frequently follow where the flexible blank is used without the hardening process.

It will be understood from the above that the coating which is applied to the stiffened blank is of hard-rubber compound.

What I claim is—

1. The process herein described consisting in taking a fabric saturated or filled with the rubber compound, subjecting this fabric to a hardening or stiffening treatment to permanently harden it, applying the outer layer of rubber compound to the stiffened fabric, placing the permanently hardened or stiffened fabric with the layer thereon within a suitable mold and vulcanizing, substantially as described.

2. The process hereinbefore described consisting in taking a fabric saturated or filled with a hard-rubber compound, subjecting the said fabric to a hardening or stiffening treatment to permanently stiffen it and while maintaining the shape in which it is stiffened applying hard-rubber material thereto capable of hardening and then subjecting the whole to a vulcanizing action, substantially as described.

In testimony whereof I affix my signature in presence of two witnesses.

WILLIAM R. SINE.

Witnesses:
HENRY E. COOPER,
R. E. OURAND.